Oct. 18, 1927.
O. B. MONAHAN
AGITATOR
Filed April 8, 1926
1,645,614
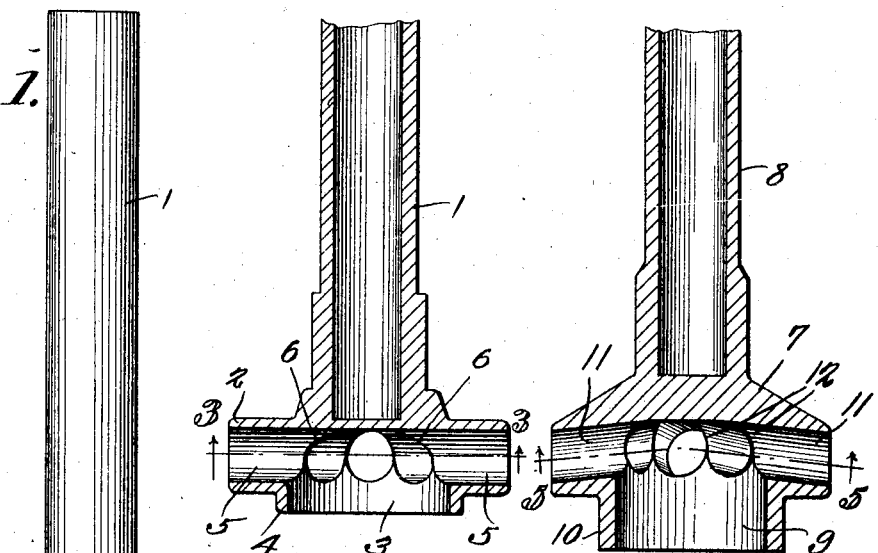
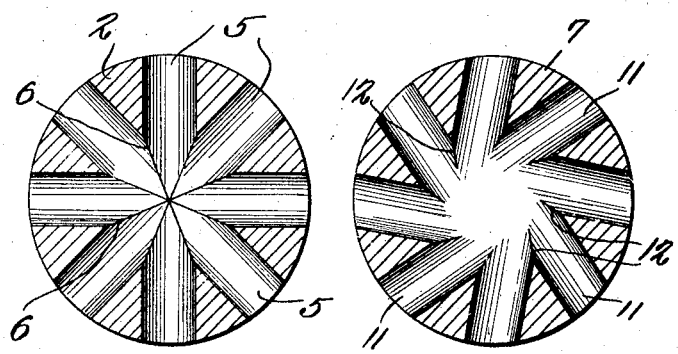
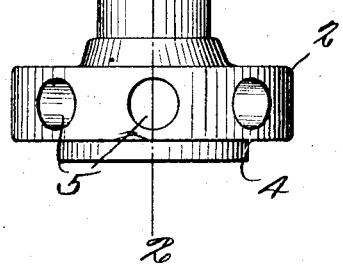
O. B. Monahan
Inventor, Patented Oct. 18, 1927.

1,645,614

UNITED STATES PATENT OFFICE.

ORMOND B. MONAHAN, OF DES MOINES, IOWA.

AGITATOR.

Application filed April 8, 1926. Serial No. 100,637.

This invention relates to an agitator designed primarily for use with drink mixing apparatus, churns, and other structures wherein it is desired to quickly agitate or mix fluids or compositions of fluids and powders.

It is an object of the present invention to provide an agitator in the form of a tool which can be used in mechanism already on the market and which, when rotated at a high speed, will operate to suck the fluid into the head of the tool and discharge it therefrom by centrifugal force, the combined suction, outward discharge and swirling action produced serving to quickly mix the fluid being treated.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings, the preferred form of the invention has been shown.

In said drawings,

Figure 1 is a side elevation of a mixer constituting the present invention.

Figure 2 is a vertical section on line 2—2 Figure 1.

Figure 3 is a section on line 3—3 Figure 2.

Figure 4 is a view similar to Figure 2 showing a slightly modified form of device.

Figure 5 is a section on line 5—5 Figure 4.

Referring to the figures by characters of reference 1 designates a shank preferably tubular and provided, at its lower end, with a disk 2 which, in the structure shown in Figures 1, 2 and 3 is circular and provided at the center of its bottom face with a circular opening 3 surrounded by a depending rib 4. Radiating from the opening 3 are peripheral outlets 5 regularly spaced and merging at and adjacent the center of the disk to form radial ridges 6.

The stem 1 is adapted to be attached to suitable operating mechanism whereby the stem will be caused to rotate at a high speed within a container, not shown. By placing a liquid in the container such as a mixture of milk and powdered malted milk and then rotating the tool at a high speed the mixture will be sucked upwardly through the opening 3 and expelled in small jets through the radial outlets 5. At the same time a swirling motion will be imparted to the body of liquid. Thus it will be seen that, as a result of the circulation set up through the opening 3 and the outlets 5 and the swirling action of the fluid the ingredients will be quickly and thoroughly mixed.

A tool such as shown in Figures 1, 2 and 3 can be rotated with equal efficiency in either direction. If desired, however, a modified structure such as shown in Figures 4 and 5 can be utilized which operates to best advantage when rotated in one direction only. In this modified structure the disk 7 provided at the lower end of the stem 8 has a central opening 9 in the bottom thereof surrounded by a depending collar 10. The outlet openings 11 in this disk are disposed at tangents to the center of the disk but have their outer ends in the periphery regularly spaced. In this modified structure the walls of the openings merge at and adjacent the center of the disk so as to provide tangential ridges 12. These ridges 12 as well as the ridges 6 provided in the structure illustrated in Figures 1, 2 and 3 serve to facilitate the expulsion of the fluid through the outlets in the disk.

A device such as described is not only useful for the purpose of preparing malted milk beverages but can also be used to advantage in churns and, in fact, wherever it is desired to quickly and thoroughly mix or agitate the liquid contents of a container.

What is claimed is:

1. An agitating device including a stem adapted for high speed rotation, a disk at the lower end of the stem having outlets extending from the periphery thereof inwardly toward the center, there being a fluid inlet in the bottom of the disk of greater diameter than the diameter of each of the outlets, said inlet intersecting the inner end of the outlets and the walls of the inlet and outlets cooperating to provide agitating ribs between the outlets diverging toward the wall of the inlet.

2. An agitating device including a stem adapted for high speed rotation, a disk at the lower end of the stem having outlets extending from the periphery thereof inwardly toward the center, there being a fluid inlet in the bottom of the disk of greater diameter than the diameter of each of the outlets, said inlet intersecting the inner end of the outlets and the walls of the inlet and outlets cooperating to provide agitating ribs between the outlets diverging toward the wall of the inlet, said outlets being tangentially disposed relative to the inlet and being inclined upwardly and inwardly within the disk.

In testimony that I claim the foregoing as my own, I have hereto affixed my signature.

ORMOND B. MONAHAN.